United States Patent
Wurmfeld

(10) Patent No.: US 10,339,508 B1
(45) Date of Patent: Jul. 2, 2019

(54) METHODS FOR DETERMINING USER EXPERIENCE (UX) EFFECTIVENESS OF ATMS

(71) Applicant: Capital One Services, LLC, McLean, VA (US)

(72) Inventor: David K. Wurmfeld, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/894,529

(22) Filed: Feb. 12, 2018

(51) Int. Cl.
  *G06Q 20/18* (2012.01)
  *G06Q 20/30* (2012.01)
  *G06Q 20/10* (2012.01)
  *G06N 20/00* (2019.01)

(52) U.S. Cl.
  CPC ......... *G06Q 20/1085* (2013.01); *G06N 20/00* (2019.01)

(58) Field of Classification Search
  CPC .......... G06F 21/32; G06F 3/015; G06F 3/011; G06Q 20/1085; G06Q 20/40; G06Q 30/0269; H04L 67/10; H04L 2463/082; H04L 63/08; H04L 63/0861; H04L 67/18; H04L 67/22; A61B 5/165; A61B 2562/0219; A61B 5/0205; A61B 5/742
  USPC ............ 705/43; 707/736, 694; 726/19, 26, 5
  See application file for complete search history.

(56) References Cited

U.S. PATENT DOCUMENTS

| | | | |
|---|---|---|---|
| 6,334,110 B1 | 12/2001 | Walter et al. | |
| 9,716,599 B1 | 7/2017 | Gates et al. | |
| 9,734,410 B2 | 8/2017 | Gottlieb | |
| 9,818,126 B1* | 11/2017 | Faith | .................. G06Q 30/0201 |
| 9,892,413 B2* | 2/2018 | Crowell | ............. G06K 9/00308 |
| 2008/0172261 A1 | 7/2008 | Albertson et al. | |
| 2013/0115582 A1 | 5/2013 | el Kaliouby et al. | |
| 2014/0025385 A1* | 1/2014 | Atri | .................. H04N 21/42203 704/270 |
| 2014/0316881 A1 | 10/2014 | Movellan et al. | |
| 2014/0323817 A1 | 10/2014 | el Kaliouby et al. | |
| 2015/0044649 A1 | 2/2015 | Voss et al. | |

(Continued)

FOREIGN PATENT DOCUMENTS

WO  WO 2012-089906  * 7/2012

OTHER PUBLICATIONS

Hung et al., "Project Deidre (I)—Modeling Human Facial Expressions", Cornell ECE, people.ece.cornell.edu/land/OldStudentProjects/cs490-95to96/HJKIM/deidre.html, Dec. 11, 1995.

(Continued)

*Primary Examiner* — Kelly S Campen
(74) *Attorney, Agent, or Firm* — DLA Piper LLP US

(57) ABSTRACT

Computer implemented system and methods are provided for evaluating the effectiveness of personalized automated teller machines. In some embodiments, the system may include a camera, an automated teller machine comprising a user interface based on a user profile and at least one server geographically remote from the automated teller machine. The server may be configured to receive a recorded user interaction, receive transaction data, determine an emotion state, extract environmental data, determine a quality indicator for the recorded user interaction, update a user profile, and transmit to the automated teller machine the updated user profile.

8 Claims, 8 Drawing Sheets

(56) References Cited

U.S. PATENT DOCUMENTS

| | | | |
|---|---|---|---|
| 2015/0066764 A1* | 3/2015 | Crowell | G06K 9/00308 |
| | | | 705/44 |
| 2015/0100487 A1* | 4/2015 | Crowell | G06K 9/00308 |
| | | | 705/41 |
| 2016/0300102 A1 | 10/2016 | Hajiyev et al. | |
| 2017/0228501 A1* | 8/2017 | Turner, Jr. | G06F 19/325 |
| 2017/0308909 A1* | 10/2017 | Faith | G06Q 30/0201 |
| 2017/0357969 A1* | 12/2017 | Huang | G06F 21/31 |
| 2017/0372056 A1* | 12/2017 | Narasimhan, Sr. | G06F 21/36 |
| 2018/0160262 A1* | 6/2018 | Austraat | G06K 9/00744 |
| 2018/0160263 A1* | 6/2018 | Austraat | G06K 9/00744 |

OTHER PUBLICATIONS

Hung et al., "Project Deidre (II)—Animating Human Facial Expressions", Cornell ECE, people.ece.cornell.edu/land/OldStudentProjects/cs490-95to96/HJKIM/deidrell.html, Apr. 20, 1996.

Khatchadourian, "We Know How You Feel", The New Yorker, Jan. 19, 2015.

"Computer Vision Technology", Sension—A Visual Interface, www.sension.co, 2008.

"Emotient Module: Facial Expression Emotion Analysis", iMotions, imotions.com/emotient/, 2018.

"Metrics—Affectiva Developer Portal", Affectiva, developer.affectiva.com/metrics/, 2018.

"White Paper: Emotion Measurement", Realeyes, realeyesit.com, 2016.

\* cited by examiner

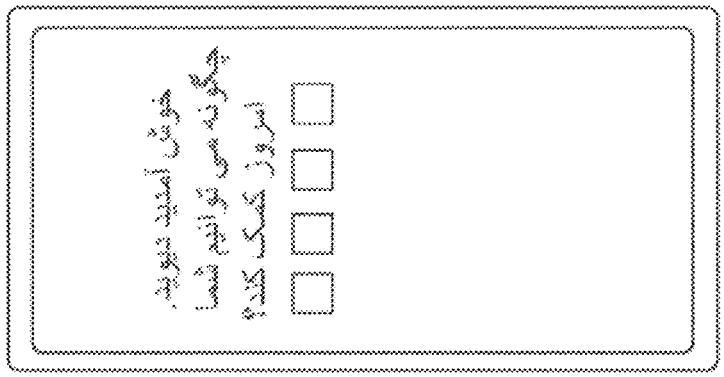
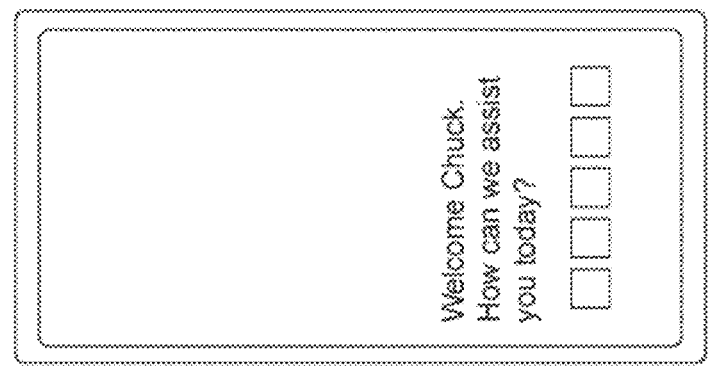
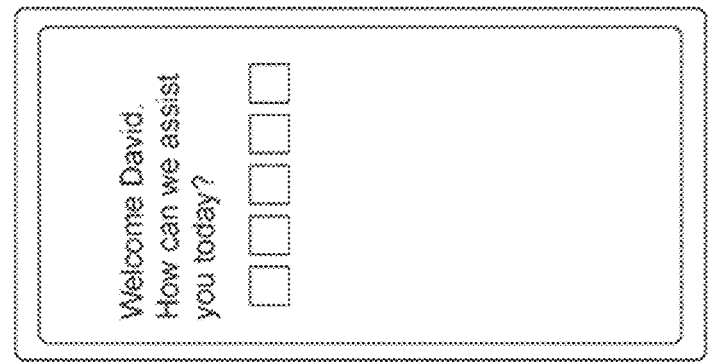
FIG. 5

METHODS FOR DETERMINING USER EXPERIENCE (UX) EFFECTIVENESS OF ATMS

CROSS-REFERENCE TO RELATED APPLICATIONS

The present disclosure is related to U.S. application Ser. No. 15/389,313 entitled "Personalized Automatic Teller Machine," the contents of which are hereby incorporated by reference.

TECHNICAL FIELD

The present disclosure is generally related to improvements to automated customer interaction machines (e.g., automatic teller machines (ATMs)). More particularly, the present disclosure is related to evaluating user experiences with ATMs and facilitating hardware and software adjustments based on the user experience evaluations for personalized ATMs.

BACKGROUND

The ubiquity of automatic teller machines, or ATMs, has increased substantially in recent decades. While greater availability and improved features have made ATMs more useful in certain ways, numerous limitations in ATM design have remained. Often, ATMs are more difficult for some users to operate than for others. For example, ATMs often include a display that can only be viewed from a limited range of viewing angles and lines of sight. This may make operation of the ATM difficult or uncomfortable, particularly for users outside of the nominal height range for viewing the ATM display that must strain to operate the machine.

Further, many aspects of ATM design are often fixed and unchangeable when an ATM is in service. Examples include display location, button location, button size, hardware for accepting transaction cards or currency, language, color combination, and placement of signs and instructions. Such aspects may be configured optimally for some users, but due to their fixed nature may render ATM use inconvenient or impossible for other users.

Prior work in the field such as U.S. application Ser. No. 15/389,313, presented systems and methods for providing personalized user experiences to ATM customers. However, there remains a need to be able to determine which (if any) of the personalized user experiences are most optimal for users.

SUMMARY

The present disclosure is directed towards systems and methods for determining the user experience (UX) effectiveness of automated customer interaction machines such as ATMs. In one embodiment, the systems and methods described herein may enable determination of which (if any) of the personalized user experiences provided by an automated customer interaction machine is most optimal for users.

In one embodiment, a method in accordance with the present disclosure may include the steps of receiving on a server communicatively coupled to an automated teller machine via a network, a recorded user interaction and transaction data for the recorded user interaction. The server may include a non-transitory memory storing computer-readable instructions and at least one processor. The method may include the steps of determining an emotion state for a user of the automated teller machine based on the recorded user interaction, extracting environmental data from the recorded user interaction, determining a quality indicator for the recorded user interaction based on at least one of the determined emotion state, the transaction data, and the environmental data, and updating a user profile based on the determined quality indicator for the user interaction, and transmitting, to the automated teller machine, the updated user profile.

In another embodiment, a method in accordance with the present disclosure may include the steps of providing a user interface on an automated teller machine to a user of the automated teller machine, wherein the user interface is based on a user profile, recording a user interaction with the user interface, transmitting the recorded user interaction and transaction data for the recorded user interaction to a server, receiving, from the server, an updated user profile reflective of a determined quality indicator of the user interaction and adjusting the user interface based on the updated user profile.

In yet another embodiment, a system in accordance with the present disclosure may include a camera, an automated teller machine further comprising a user interface based on a user profile, and at least one server geographically remote from the automated teller machine. The at least one server may be communicatively coupled to the camera and the automated teller machine via a network and include a non-transitory memory storing computer-readable instructions and at least one processor. Execution of the instructions by the processor may cause the at least one server to receive a recorded user interaction from the camera, receive transaction data for the recorded user interaction from the automated teller machine, determine an emotion state for a user of the automated teller machine based on the recorded user interaction, extract environmental data from the recorded user interaction, determine a quality indicator for the recorded user interaction based on at least one of the determined emotion state, the transaction data, and the environmental data, update a user profile based on the determined quality indicator for the user interaction, and transmit, to the automated teller machine, the updated user profile.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 5 is a diagram of an exemplary ATM interface system in accordance with an aspect of the present disclosure.

DETAILED DESCRIPTION

The present disclosure is directed towards systems and methods for determining the user experience (UX) effectiveness of automated customer interaction machines such as ATMs. In one embodiment, the systems and methods described herein may enable determination of which (if any) of the personalized user experiences provided by an automated customer interaction machine is most optimal for users.

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
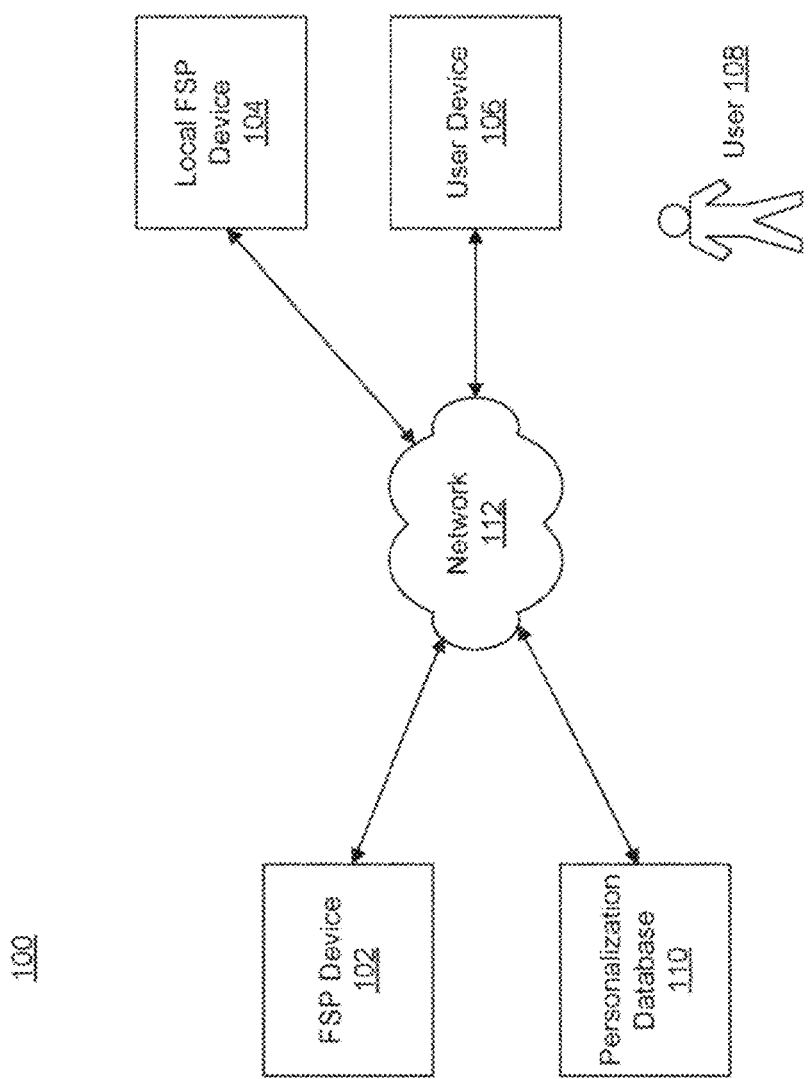
FIG. 1 is a diagram of an exemplary system in accordance with an aspect of the present disclosure.

FIG. 1 shows a diagram of an exemplary system 100, consistent with disclosed embodiments. As shown in FIG. 1, system 100 may include a financial service provider device 102, a local financial service provider device 104, a user device 106, a personalization database 110, and a network 112 to facilitate communication among the components of system 100. The components and arrangement of the components included in system 100 may vary. Thus, system 100 may further include other components that perform or assist in the performance of one or more processes consistent with the disclosed embodiments. The components and arrangements shown in FIG. 1 are not intended to limit the disclosed embodiments, as the components used to implement the disclosed processes and features may vary.

In accordance with disclosed embodiments, system 100 may include a financial service provider (FSP) device 102. FSP device 102 may be a system associated with a financial service provider (not shown), such as a bank, a credit card company, a lender, brokerage firm, or any other type of financial service entity that generates, provides, manages, maintains financial service accounts, etc. for one or more users. FSP device 102 may be one or more computing systems that are configured to execute software instructions stored on one or more memory devices to perform one or more operations consistent with the disclosed embodiments. For example, FSP device 102 may include one or more memory device(s) storing data and software instructions and one or more processor(s) configured to use the data and execute the software instructions to perform server-based functions and operations known to those skilled in the art. FSP device 102 may include one or more general purpose computers, mainframe computers, or any combination of these types of components.

In certain embodiments, FSP device 102 may be configured as a particular apparatus, system, and the like based on the storage, execution, and/or implementation of the software instructions that perform one or more operations consistent with the disclosed embodiments. FSP device 102 may be standalone, or it may be part of a subsystem, which may be part of a larger system. For example, FSP device 102 may represent distributed servers that are remotely located and communicate over a network (e.g., network 112) or a dedicated network, such as a LAN, for a financial service provider. An exemplary computing system consistent with FSP device 102 is discussed in additional detail with respect to FIG. 2, below.

FSP device 102 may include or may access one or more storage devices configured to store data and/or software instructions used by one or more processors of FSP device 102 to perform operations consistent with disclosed embodiments. For example, FSP device 102 may include memory 230 configured to store one or more software programs that performs several functions when executed by a processor. The disclosed embodiments are not limited to separate programs or computers configured to perform dedicated tasks. For example, FSP device 102 may include memory that stores a single program or multiple programs. Additionally, FSP device 102 may execute one or more programs located remotely from FSP device 102. For example, FSP device 102 may access one or more remote programs stored in memory included with a remote component that, when executed, perform operations consistent with the disclosed embodiments. In certain aspects, FSP device 102 may include server software that generates, maintains, and provides services associated with financial account management. In other aspects, FSP device 102 may connect separate server(s) or similar computing devices that generate, maintain, and provide services associated with financial data for a financial service provider associated with FSP device 102.

System 100 may also include one or more local FSP devices 104. Local FSP devices may include, for example, Automatic Teller Machines ("ATMs") or detection devices in local FSP branches or other locations (e.g., retail locations, gas stations, etc.). Local FSP device 104 may include one or more memory device(s) that store data that may be used for performing one or more processes consistent with the disclosed embodiments. In certain aspects, local FSP device 104 may additionally, or alternatively, include one or more computer devices. For example, local FSP device 104 may include one or more memory device(s) storing data and software instructions and one or more processor(s) configured to use the data and execute the software instructions to perform computing functions and operations known to those skilled in the art.

Local FSP device 104 may further include computer device(s) that are configured to execute stored software instructions to perform operations associated with collecting, storing, and accessing biometric data, including one or more processes associated with gathering biometric data from a variety of sources, compiling the data, and organizing the data into easily accessible profiles. Local FSP device 104 may include one or more computer device(s) that may be a general purpose computer, server, mainframe computer, or any combination of these components. In certain embodiments, local FSP device 104 (or a system including local FSP device 104) may be configured as a particular apparatus, system, and the like based on the storage, execution, and/or implementation of the software instructions that perform one or more operations consistent with the disclosed embodiments. A local FSP device 104 may be standalone, or it may be part of a subsystem, which may be part of a larger system. For example, local FSP device 104 may represent distributed servers that are remotely located and communicate over a network (e.g., network 112) or a dedicated network, such as a LAN. An exemplary computer system consistent with local FSP device 104 is discussed in additional detail with respect to FIG. 2. In certain embodiments, a third party may operate the components associated with local FSP device 104. Additionally or alternatively, local FSP device 104 may be a part or subpart of FSP device 102.

System 100 may further include one or more user devices 106. A user 108 may operate a user device 106, which may be a desktop computer, laptop, tablet, smartphone, multifunctional watch, pair of multifunctional glasses, tracking device, chip-enabled payment card, or any suitable device with computing capability. User device 106 may include one or more processor(s) and memory device(s) known to those skilled in the art. For example, user device 106 may include memory device(s) that store data and software instructions that, when executed by one or more processor(s), perform operations consistent with the disclosed embodiments. In one aspect, user device 106 may have a financial application installed thereon, which may enable user device 106 to communicate with FSP device 102 and/or local FSP device 104 via network 112. For instance, user device 106 may be a smartphone or tablet (or the like) that executes a stored mobile application that performs online banking operations. In other embodiments, user device 106 may connect to FSP device 102 and/or local FSP device 104 through use of browser software stored and executed by user device 106. User device 106 may be configured to execute software instructions to allow a user to access information stored in FSP device 102, such as, for example, financial information related to purchase transactions, financial statements, account information, rewards program information and the like. Additionally, user device 106 may be configured to execute software instructions that initiate and conduct transactions with FSP device 102 or local FSP device 104, such as, for example, ATM withdrawals, wire transfers, debit card PIN resets, and call center transactions. An exemplary computer system consistent with user device 106 is discussed in additional detail with respect to FIG. 2.

User 108 may operate user device 106 to perform one or more operations consistent with the disclosed embodiments. In one aspect, user 108 may be a customer of a financial service provider associated with FSP device 102. For instance, a financial service provider may maintain a financial service account (e.g., checking account, savings account, debit card account, or credit card account) for user 108 that the user may use to purchase goods and/or services. Additionally or alternatively, user 108 may use user device 106 and the financial service account (for example, through a mobile application installed on user device 106) to withdraw cash from an ATM (such as local FSP device 104), contact a customer call center, transfer or wire money, or reset their debit account PIN.

User 108 may further operate user device 106 in order to be detected and recognized by local FSP device 104. For example, user device 106 may detect, through the user of network 112, a local FSP device 104 in its immediate proximity. Additionally or alternatively, local FSP device 104 may detect user device 106 in its immediate proximity. User device 106 may then connect to local FSP device 104 in order to initiate, conduct, or complete a financial transaction.

System 100 may also include one or more personalization databases 110. Personalization database 110 may include one or more memory device(s) that store data that may be used for performing one or more processes consistent with the disclosed embodiment. In certain aspects, personalization database 110 may additionally, or alternatively, include one or more servers or other type of computer devices. The personalization database 110 server(s) may be one or more computing devices configured to execute software instructions stored in memory to perform one or more processes consistent with the disclosed embodiments. For example, personalization database 110 may include one or more memory device(s) storing data and software instructions and one or more processor(s) configured to use the data and execute the software instructions to perform server-based functions and operations known to those skilled in the art.

Personalization database 110 may further include server(s) that are configured to execute stored software instructions to perform operations associated with collecting, storing, and accessing profile data related to user 108, including one or more processes associated with gathering, for example, data related to user 108's demographics, accessibility needs, display preferences, and biometrics information. Personalization database 110 may gather the data from a variety of sources, compile the data, and organize the data into easily accessible profiles. Personalization database 110 may include one or more servers that may be a general purpose computer, a mainframe computer, or any combination of these components. In certain embodiments, Personalization database 110 (or a system including personalization database 110) may be configured as a particular apparatus, system, and the like based on the storage, execution, and/or implementation of the software instructions that perform one or more operations consistent with the disclosed embodiments. A personalization database 110 may be standalone, or it may be part of a subsystem, which may be part of a larger system. For example, personalization database 110 may represent distributed servers that are remotely located and communicate over a network (e.g., network 112) or a dedicated network, such as a LAN. An exemplary computer system consistent with personalization database 110 is discussed in additional detail with respect to FIG. 2.

In certain embodiments, personalization database 110 may be associated with an entity, such as a company, organization, agency, etc. In one embodiment, the personalization database entity may be a different entity than a financial service provider associated with FSP device 102. In certain aspects, a user or user(s) affiliated with a personalization database entity may operate one or more components associated with personalization database 110 to collect and maintain personalization data. In other embodiments, personalization database 110 may be associated with a financial service provider or other entity associated with FSP device 102. For example, personalization database 110 may be a part or subpart of FSP device 102.

Network 112 may comprise any type of computer networking arrangement used to exchange data. For example, network 112 may be the Internet, a private data network, a virtual private network using a public network, a WiFi network, a LAN or WAN network, and/or other suitable connections that may enable information exchange among various components of the system 100. Network 112 may also include a public switched telephone network ("PSTN") and/or a wireless cellular network. Network 112 may be a secured network or unsecured network. In other embodiments, one or more components of system 100 may communicate directly through a dedicated communication link(s), such as links between user device 106, FSP device 102, local FSP device 104, and personalization database 110.

Additionally or alternatively, network 112 may include a direct communication network. Direct communications may use any suitable technologies, including, for example, Bluetooth™, Bluetooth LE™ (BLE), WiFi, near field communications (NFC), or other suitable communication methods that provide a medium for transmitting data between separate devices. In certain embodiments, user device 106 and local FSP device 104 may connect and communicate through a direct communications network, for example, based on any of the above networking technologies.

Other components known to one of ordinary skill in the art may be included in system 100 to process, transmit, provide, and receive information consistent with the disclosed embodiments.

Figure 2:
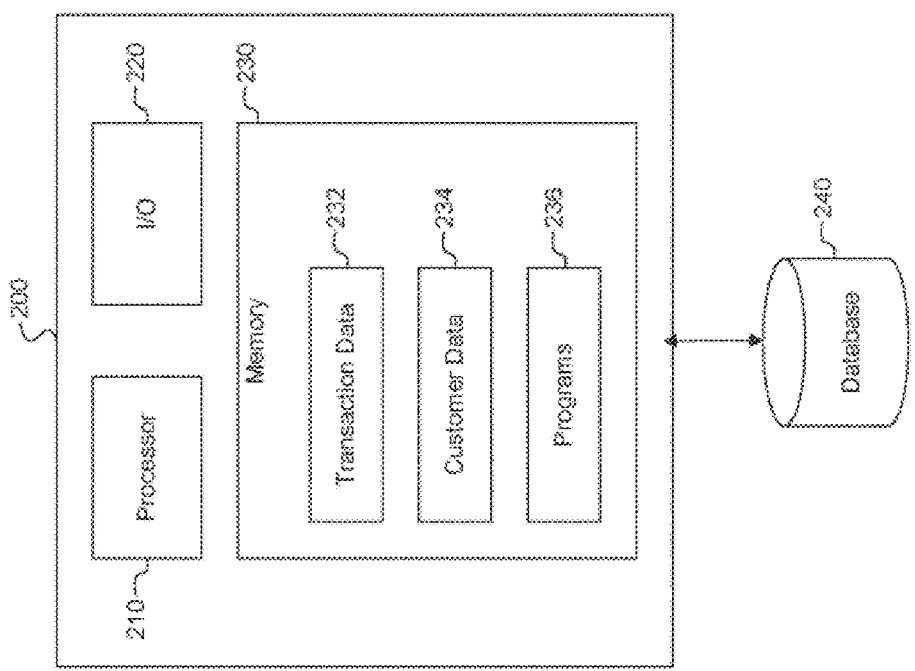
FIG. 2 is a diagram of an exemplary computer system in accordance with an aspect of the present disclosure.

FIG. 2 shows a diagram of an exemplary computing system 200 illustrating a computing system configuration that may be associated with FSP device 102, local FSP device 104, user device 106, and/or personalization device 110, consistent with disclosed embodiments. In one embodiment, computing system 200 may have one or more processors 210, one or more memories 230, and one or more input/output (I/O) devices 220. In some embodiments, computing system 200 may take the form of a server, general purpose computer, a mainframe computer, laptop, smartphone, mobile device, or any combination of these components. In certain embodiments, computing system 200 (or a system including computing system 200) may be configured as a particular apparatus, system, and the like based on the storage, execution, and/or implementation of the software instructions that perform one or more operations consistent with the disclosed embodiments. Computing system 200 may be standalone, or it may be part of a subsystem, which may be part of a larger system.

Processor 210 may include one or more known processing devices, such as a microprocessor from the Pentium™ or Xeon™ family manufactured by Intel™, the Turion™ family manufactured by AMD™, or any of various processors manufactured by Sun Microsystems. Processor 210 may constitute a single core or multiple core processor that executes parallel processes simultaneously. For example, processor 210 may be a single core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. In another embodiment, processor 210 may include a multiple-core processor arrangement (e.g., dual, quad core, etc.) configured to provide parallel processing functionalities to allow computing system 200 to execute multiple processes simultaneously. One of ordinary skill in the art would understand that other types of processor arrangements could be implemented that provide for the capabilities disclosed herein. The disclosed embodiments are not limited to any type of processor(s) configured in computing system 200.

Memory 230 may include one or more storage devices configured to store instructions used by processor 210 to perform functions related to the disclosed embodiments. For example, memory 230 may be configured with one or more software instructions, such as program(s) 236 that may perform one or more operations when executed by processor 210. The disclosed embodiments are not limited to separate programs or computers configured to perform dedicated tasks. For example, memory 230 may include a program 236 that performs the functions of computing system 200, or program 236 could comprise multiple programs. Additionally, processor 210 may execute one or more programs located remotely from computing system 200. For example, FSP device 102, local FSP device 104, user device 106, or personalization database 110, may, via computing system 200 (or variants thereof), access one or more remote programs that, when executed, perform functions related to certain disclosed embodiments. Processor 210 may further execute one or more programs located in database 240. In some embodiments, programs 236 may be stored in an external storage device, such as a cloud server located outside of computing system 200, and processor 210 may execute programs 236 remotely.

Programs executed by processor 210 may cause processor 210 to execute one or more processes related to financial services provided to users including, but not limited to, processing credit and debit card transactions, checking transactions, fund deposits and withdrawals, transferring money between financial accounts, lending loans, processing payments for credit card and loan accounts, processing orders for certified funds, processing orders for new or reissue debit cards, and processing ATM cash withdrawals.

Memory 230 may also store data that may reflect any type of information in any format that the system may use to perform operations consistent with the disclosed embodiments. Memory 230 may store instructions to enable processor 210 to execute one or more applications, such as server applications, network communication processes, and any other type of application or software. Alternatively, the instructions, application programs, etc., may be stored in an external storage (not shown) in communication with computing system 200 via network 112 or any other suitable network. Memory 230 may be a volatile or non-volatile, magnetic, semiconductor, tape, optical, removable, non-removable, or other type of storage device or tangible (i.e., non-transitory) computer-readable medium.

Memory 230 may include transaction data 232. Transaction data 232 may include information related to financial transactions initiated by a user. For example, transaction data may include a user identifier and a transaction type. The user identifier may be a credit or debit card number, and account number, or another means for identifying the user initiating the financial transaction. The transaction type may include an indicator of the type of transaction the user is initiating, such as, ATM cash withdrawal, debit PIN reset, money wire or transfer, call to the customer service center, ordering a new or reissue debit card, ordering certified funds, or other transactions requiring user authentication. Transaction data 232 may also include authentication data obtained from the user for the purposes of authorizing the transaction by verifying the authenticity of provided biometric data as compared to stored biometric data. Additionally or alternatively, transaction data 232 may be stored in database 240 or in an external storage (not shown) in communication with computing system 200 via network 112 or any other suitable network.

Memory 230 may further include customer data 234. Customer data 234 may include information about particular customers of the financial service provider. For example, customer data 234 may include clients' account information, debit or credit card information, history of purchase transactions, financial statements, credit score, risk profile, username and password, debit card PIN, home and work locations, and/or biometric information. Additionally, customer data 234 may include user device identification information, such as, for example, a phone number, email address, IP address, Bluetooth signature, or other device identifier. Alternatively customer data 234 may be stored in database 240, or in an external storage (not shown) or in personalization database 110 in communication with computing system 200 via network 112 or any other suitable network.

Processor 210 may analyze transaction data 232 in reference to customer data 234. For example, processor 210 may analyze transaction data to determine which client with information stored in customer data 234 is initiating the financial transaction. Processor 210 may access the particular user's customer information to determine their account information, debit or credit card information, history of purchase transactions, financial statements, credit score, risk profile, username and password, debit card PIN, home and work locations, and/or authentication data.

I/O devices 220 may be one or more device that is configured to allow data to be received and/or transmitted by computing system 200. I/O devices 220 may include one or more digital and/or analog communication devices that allow computing system 200 to communicate with other machines and devices, such as other components of system 100 shown in FIG. 1. For example, computing system 200 may include interface components, which may provide interfaces to one or more input devices, such as one or more keyboards, mouse devices, displays, touch sensors, card readers, biometric readers, cameras, scanners, microphones, wireless communications devices, and the like, which may enable computing system 200 to receive input from an operator of local FSP device 102, such as user 108.

Computing system 200 may also contain one or more database(s) 240. Alternatively, computing system 200 may be communicatively connected to one or more database(s) 240. Computing system 200 may be communicatively connected to database(s) 240 through network 112. Database 240 may include one or more memory devices that store information and are accessed and/or managed through computing system 200. By way of example, database(s) 240 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. Database 240 may include computing components (e.g., database management system, database server, etc.) configured to receive and process requests for data stored in memory devices of database(s) 240 and to provide data from database 240.

As discussed above, local FSP device 104 may include at least one computing system 200. Further, although sometimes discussed here in relation to local FSP device 104, it should be understood that variations of computing system 200 may be used by other components of system 100, including FSP device 102 user device 106, and personalization database 110. Computing system 200 may be a stand-alone device or server or may be configured as a distributed computer system including multiple servers or computers that interoperate to perform one or more of the processes and functionalities associated with the disclosed embodiments.

Figure 3:
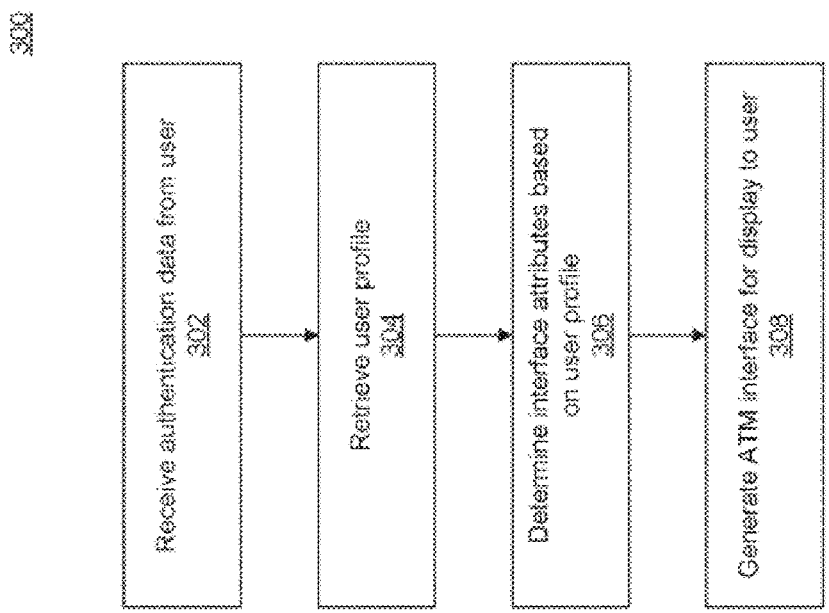
FIG. 3 is a flowchart of an exemplary process for ATM personalization system in accordance with an aspect of the present disclosure.

FIG. 3 shows an exemplary ATM personalization process, consistent with disclosed embodiments. Process 300 may be performed by processor 210 of, for example, local FSP device 104 executing instructions encoded on a computer-readable medium storage device for providing ATM functionality. It is to be understood, however, that one or more steps of process 300 may be implemented by other components of system 100 (shown or not shown), including, FSP device 102 and/or user device 108.

At step 302, local FSP device 104 may receive authentication data from a user. Authentication data may be identifying information such as an account number, personal identification number (PIN), social security number, biometric information etc. As an example, user 108 may insert a transaction card such as a credit, debit, or ATM card into a card reader (not shown) connected to local FSP device 104 in order to identify user 108's association with a financial service provider. FSP device 104 may also receive a fingerprint, iris scan, or voice sample provided to a sensor in communication with local FSP device 104. Alternatively, FSP device 104 may receive authentication via a wired or wireless connection with user device 106.

At step 304, local FSP device 104 may retrieve user profile 304. For example, local FSP device 104 may communicate with personalization database 110 and/or FSP device 102, over network 112, to request user profile 304. Alternatively, user profile 304 may be received from user device 106.

At step 306, local FSP device 104 may determine interface attributes based on the retrieved user profile. The determined attributes may vary widely, and may be based on any number of attributes or preferences of user 108.

At step 308, local FSP device 104 may generate an ATM interface for display to user 108, based on the determined interface attributes.

Figure 4:
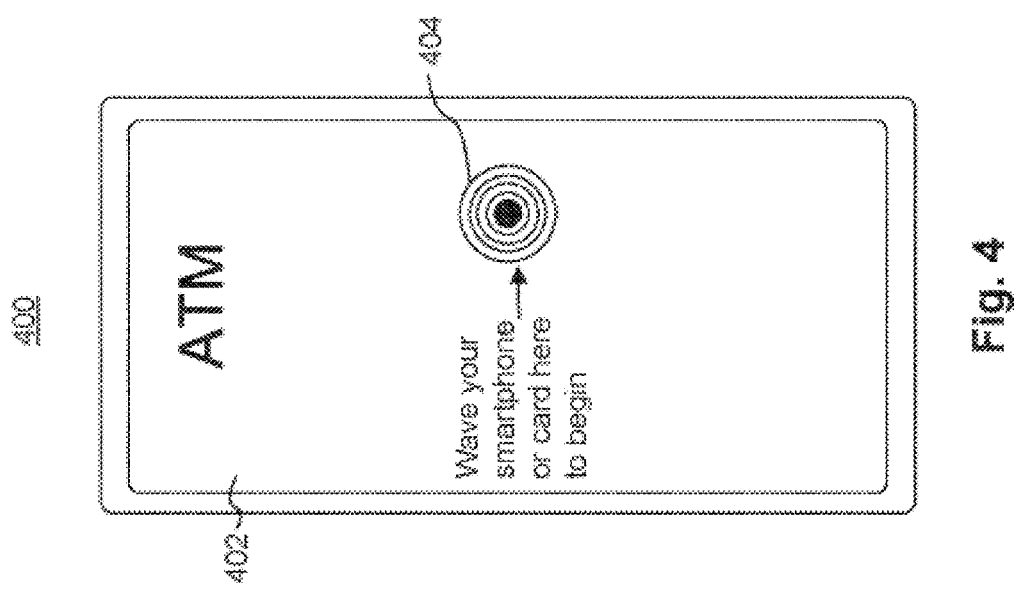
FIG. 4 is a diagram of a portion of an exemplary ATM interface system in accordance with an aspect of the present disclosure.

FIG. 4 shows ATM 400, an example of an embodiment of local FSP device 104. ATM 400 may include a touch-sensitive display 402. Display 402 may comprise any size or form factor display based on any display technology, such as LCD, CRT, plasma, OLED, etc. As an example, FIG. 4 depicts display 402 as a 78" diagonal OLED display. As shown in FIG. 4, display 402 may be oriented vertically such that the display is taller than it is wide. Display 402 may be mounted flush with a wall or other surface or behind a glass barrier (not shown) such that unauthorized devices may be more difficult to attach to ATM 400 and/or more easily detected.

As shown in FIG. 4, ATM 400 may display an interface via display 402, requesting authorization data from user 108. ATM 400 may display a graphical element such as a target 404, indicating a portion of display 402, that is enabled to, or is in proximity to a device enabled to connect to user device 106. User 108 may position user device 106 close to target 404, initiating a wireless connection between user device 106 and ATM 400, in which ATM 400 may receive user 108's authorization data.

FIG. 5 illustrates various interfaces that may display via display 402 of ATM 400 and include attributes determined based on the user profile. For example, the left most interface illustrates an interface that may be generated based on user profile information associated with user 108 that indicates that user 108 is of above average height. As illustrated in the left most ATM, the ATM 400 may further determine a portion of display 402 to remain unused. For example, ATM 400 may generate an interface that occupies only a portion of display 402, based on the portion of the display likely to be convenient to reach and/or view based on user 108's user profile information. Alternatively, space outside user 108's reach or view may be used to display a background image, such as a patterned wallpaper, the logo of the financial service provider associated with ATM 400, or the like.

The center ATM in FIG. 5 illustrates an example of an interface that may be displayed based on user profile information that indicates that user 108 is of below average height, wherein the interface occupies a lower portion of display 402.

The right ATM in FIG. 5 illustrates an example of an interface that may be displayed based on user profile information that indicates that user 108 speaks a particular language. As shown in FIG. 5, ATM 400 may also automatically display an interface in user 108's preferred language, based on received user profile information.

User profile information may include information related to abilities or disabilities of user 108. User profile information may include information related to visual ability, hearing ability or motor skills. For example, in one embodiment ATM 400 may determine that an ATM interface will display interface elements such as buttons, text, or images of a particular size or contrast, or favor, or avoid certain colors, patterns, or animations due to eye conditions or colorblindness. User profile information may also include information related to a user's ability to use touch based input devices. For example, if a user has difficulty with touch based input devices, and have a tendency to select multiple interface elements inadvertently, this tendency may be included in the user's profile information. As a result, the ATM 400 may generate an ATM interface that ignores repeated inputs in a short period of time. User profile information may also include information indicating that a user has a hearing disability. Based on this information ATM 400 may generate an interface that includes amplified or adapted audio, favors visual cues over audio, incorporates Telecommunications Devices for the Deaf (TTD) services, etc. Additionally or alternatively, user 108's profile information may include an indication that user 108 uses a hearing device such as a hearing aid or an implant such as those distributed by Cochlear Ltd. ATM 400 may automatically pair with a Bluetooth or other wireless audio feature included in such devices based on information included in user profile information.

Retrieved user profile information may include information related to services in which user 108 is enrolled. For example, user 108 may be an account holder of a financial account that accepts checks or other written instruments for deposits and/or payments. Based on retrieved user profile information, ATM 400 may request that user 108 present such a payment instrument. The payment instrument may be accepted at ATM 400 in a variety of ways such as via a slot or an image capture device (e.g., a scanner or camera), and instructions for presenting payment may be adapted based on other aspects of user 108's user profile information.

In one embodiment, the user profile information includes an indication of a height of a user. In one embodiment, user interface attributes may be determined based on the user profile information. In one embodiment, determining the user interface attributes includes assigning touch input locations on the touch-sensitive display based on the indication of the height of the user. Determining the user interface attributes may also include assigning locations of interface elements on the touch-sensitive display at a height based on the indication of the height of the user. Additionally or alternatively, determining user interface attributes may include assigning a language of the user interface based on the user profile information. Determining user interface attributes may include determining a portion of the touch-sensitive display that will be unused by the automatic teller machine interface. The unused portion of the touch-sensitive display may be determined based on a portion of the display outside one or more of the user's reach or view, based on the user profile information. In one embodiment determining user interface attributes may include assigning at least one of text size, interface element size, or interface element color, based on the user profile information. In one embodiment, user profile information may include a height, a language, a gender, an age, an address, and/or an income.

By generating an automatic teller machine interface on the touch-sensitive display based on the user profile information in accordance with the systems and methods described herein, a ATM may provide a user with a personalized user experience. According to an aspect of the present disclosure, video data corresponding to a user interaction with the personalized user experience ATM may be analyzed to determine human emotion and better understand user experiences at the ATM. Understanding user experiences at the ATM may be used to optimize or improve the ATM interface and overall user experience.

Moreover, in some embodiments, the automatic teller machine interface may include global parameters that are common to all users, or a subset thereof. Accordingly, the automatic teller machine interface or portions thereof may be constructed based on the global parameters (and/or user profile information). As will be discussed further below, in some embodiments, the global parameters may be updated based on the quality of the user experience for a plurality of users. In this manner, the automatic teller machine interface, or a sequence of automatic teller machine interfaces may be adjusted based on correlated experiences across all users or subsets thereof.

Figure 6:
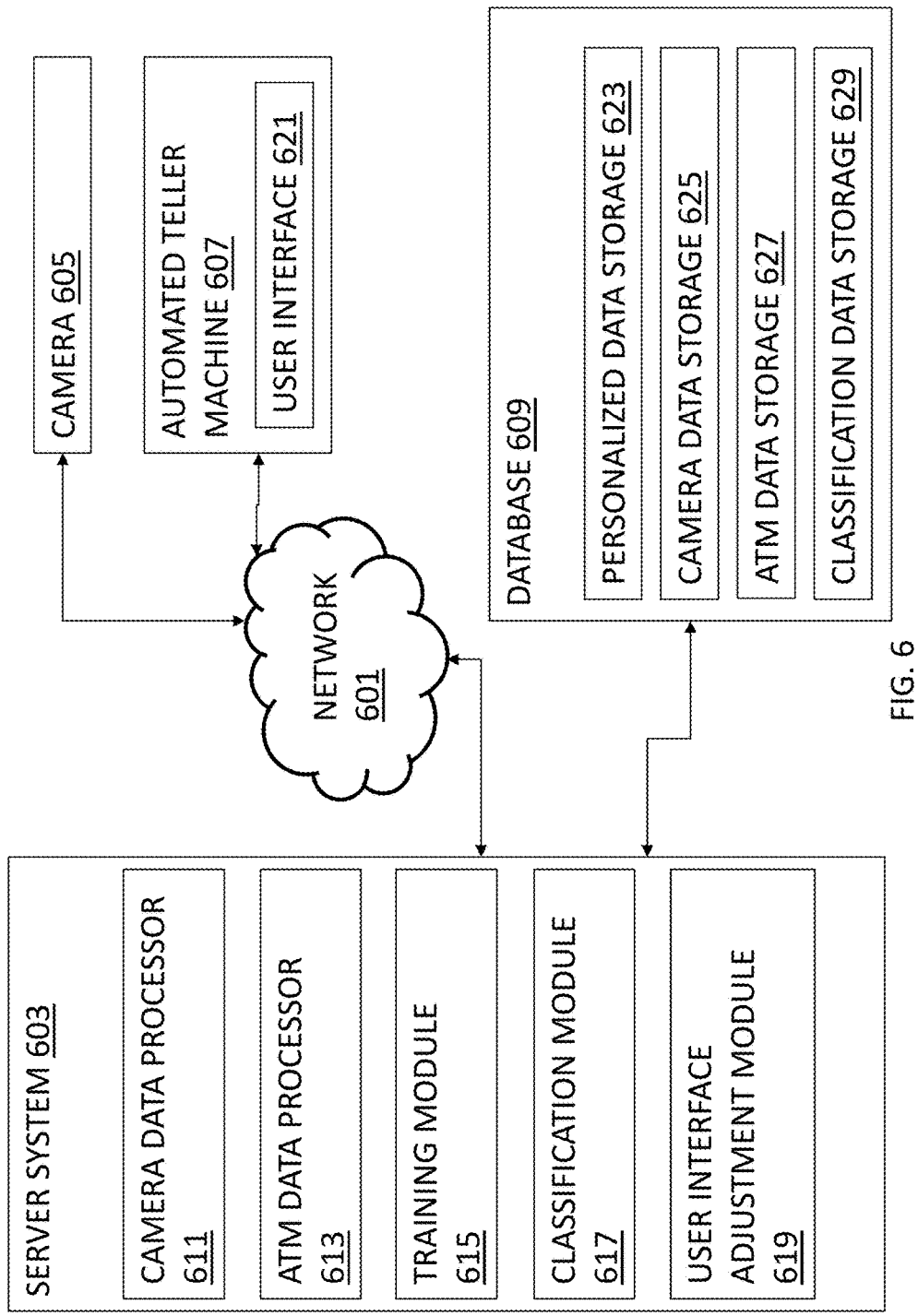
FIG. 6 is a diagram of an exemplary computer system in accordance with an aspect of the present disclosure.

FIG. 6 shows an exemplary system for evaluating the effectiveness of the personalized user experiences provided by ATMs such as those depicted in FIG. 5. As illustrated in FIG. 6, a server system 603 may be communicatively coupled to a network 601. Network 601 may be communicatively coupled to a camera 605 and an automated teller machine 607. In one embodiment the camera 605 may be integrated into the automated teller machine 607. Alternatively, the camera 605 may be separate from the automated teller machine 607, as illustrated in FIG. 6. The automated teller machine 607 may be analogous to ATM 400 and include a user interface 621. The server system 603 may be analogous to the FSP device 102 of FIG. 1.

In one embodiment, the system may include the camera 605, the automated teller machine 607 having a user interface 621 based on a user profile, and at least one server system 603 geographically remote from the automated teller machine 607. The server system 603 may be configured to receive a recorded user interaction, receive transaction data, determine an emotion state, extract environmental data, determine a quality indicator for the recorded user interaction, update a user profile, and transmit to the automated teller machine 607 the updated user profile.

In one embodiment the server system 603 may include a camera data processor 611, an ATM data processor 613, training module 615, classification module 617, and a user interface adjustment module 619.

The camera data processor 611 may be configured to receive data from camera 605. The data received from the camera 605 may include recorded user interactions such as images, or video recordings of a user interacting with a personalized user interface 621 displayed on automated teller machine 607. The data received from the camera 605 may include time of day, time of transaction, day of transaction, and the like. The data received from the camera may be processed by camera data processor 611 to extract environmental data from the recorded user interaction. Environmental data may include at least one of weather data, and time of day data.

In one embodiment still images or video recordings may be processed to determine the user's emotion state during the recorded user interaction. Example emotion states may include anger, happiness, sadness, disgust, surprise, and fear. Emotion states may be determined by applying image processing techniques to images and/or video recordings to isolate and identify one or more muscle movements and motion cues that are associated with particular emotions (e.g., being surprised, frustrated, confused, etc.). Determining emotion states may also incorporate applying one or more techniques developed in psychology.

In one embodiment, data from the automated teller machine 607 may be received by the ATM data processor 613. Transaction data may be extracted by the ATM data processor 613. Transaction data may include received data from the automated teller machine 607 and may be data that provides information about the transaction the user participated in during the recorded user interaction. For example, transaction data may include one or more of transaction type data, time of day data, temperature data, timing data, keystroke data, button data, age group data, and language data. Transaction type data may indicate whether the user transaction is a withdrawal, transfer, deposit, or status check, etc. Keystroke data may include information regarding user keystrokes including for example, the manner and rhythm in which a user types characters on a keyboard or keypad of the automated teller machine 607. Button data may include information regarding whether a user pressed a particular button repetitively. Language data may include information regarding what language was displayed on the user interface 621. Timing data may indicate the duration of the total user experience, as well as a duration for performing particular tasks or for moving between interfaces, etc.

In one embodiment, the transaction data, environmental data and/or the emotion state information for a recorded user interaction may be synchronized based on the timing data and integrated to form an integrated data set. For example, the data received from camera 605 may be synchronized with the transaction data (e.g., based on timing information associated with each of the camera data and transaction data) such that emotion state information may be determined for each part of a user transaction. Such emotion state information may be indicative of a less than optimal interface/user experience at any particular part of the user transaction. A quality indicator for the user experience may be determined by classification module 617 to determine the quality of the user experience based on the integrated data set. In other words, the quality indicator may be determined for the recorded user interaction based on the determined emotion state, the transaction data and the environmental data. The quality indicator may be a binary value, a categorical value, and/or a numerical value that indicates the quality of the user experience. For example, the quality indicator may be a categorical value such as "good" or "bad" that indicates a positive or negative experience with the user interface. For example, the quality indicator may be a binary indicator such as "happy" and "not happy" or a part of a pre-defined range (i.e., 1-10, where 1 is despondent and 10 is deliriously happy).

In one embodiment, a training module 615 of the server system 603 may generate one or more quality indicator parameters by applying a machine learning algorithm to at least one of emotion states, transaction data and environmental data for a collection of historical user interactions. Unsupervised and/or supervised machine learning techniques may be applied to the collection of historical user interactions to determine quality indicator parameters. The quality indicator parameters may be stored in the classification data storage 629 structure of the database 609. During a training stage, the training module 615 may be used to determine the quality indicator parameters. During a predictive stage, the quality indicator parameters may be applied by the classification module 617 to the recorded user interaction and/or the integrated data set to determine the quality indicator for the recorded user interaction.

In some embodiments, a measure of a user's emotional state can be algorithmically deduced from the image and/or video of the user experience. In some embodiments, this measure of the user's emotional state may be integrated with other information, in order to determine user satisfaction with the user interface.

In some embodiments, emotion state data may be expressed as one of eight states: anger, contempt, disgust, fear, happiness, neutral, sadness, or surprise. In some embodiments, an emotion state may be expressed as a statistical value.

In one embodiment, the user interface adjustment module 619 may be configured to update user profile information stored in the personalized data storage 623 based on the determined quality indicator. For example, if the quality indicator indicates that a user had an angry emotion state, and repetitive button pushing when the font size of the user interface was decreased, the user profile information may be updated to have a larger font size. The updated user profile may then be transmitted to the automated teller machine 607, which may construct or adjust the user interface 621 based on the updated user profile information. In this manner, the disclosed system provides feedback on user experiences provided by the automated teller machines. In one embodiment, the feedback provided by the disclosed system may be advantageous to that provided by conventional evaluation methods such as focus groups and questionnaires because emotion state data is unbiased and unfiltered. For example, while a user may moderate their responses when answering a questionnaire or in a focus group, emotion state data based on user images or recordings allows an evaluation system to obtain an unbiased and unfiltered reading of the user's response to a provided automated teller machine. Moreover, the discussed system is able to integrate emotion state data with transaction type data and environmental data to provide a higher resolution into the user experience and better correlate user reactions (e.g., timing, keystrokes, facial expressions) with the provided user interface.

The provided feedback also allows for software adjustments and hardware adjustments to the automated teller machine based on the determined quality indicator.

The server system 603 may be communicatively coupled to a database 609. The database 609 may include one or more data structures. Data structures may include a personalized data storage 623 analogous to personalization database 110, camera data storage 625, ATM data storage 627, and classification data storage 629.

In some embodiments the personalized data storage 623 component may store user profile information, as discussed above. In some embodiments, the camera data storage 625 component may store camera data including the environmental data and user recordings of an interaction, as discussed above. In some embodiments, the ATM data storage 627 may store transaction data, as discussed above. In some embodiments, the data stored in the camera data storage 625 component and the ATM data storage component 627 may be used as historical data by the training module 615. In some embodiments, the classification data storage 629 may store quality indicator parameters 629 determined by the training module 615 and applied to a new recorded user interaction by the classification module 617 in order to determine the quality of the user's interaction with the automated teller machine within the new recorded user interaction.

Figure 7:
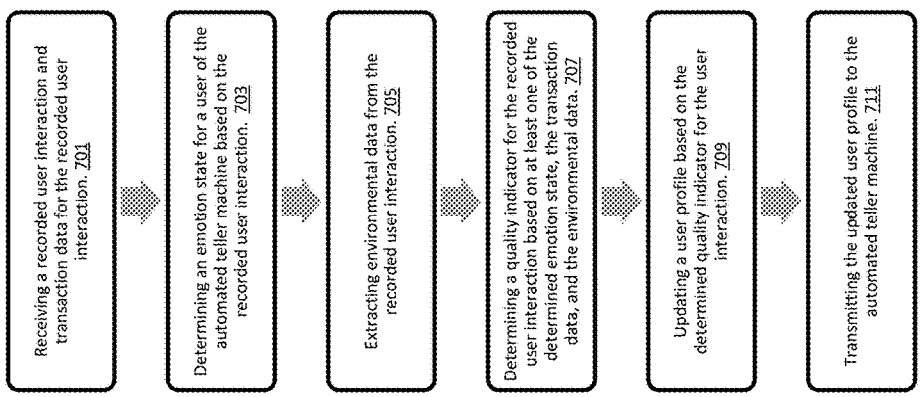
FIG. 7 is a flowchart of an exemplary process for evaluating ATM personalization systems in accordance with an aspect of the present disclosure.

FIG. 7 shows an exemplary process for evaluating ATM personalization systems, consistent with disclosed embodiments. As illustrated in FIG. 7, at step 701 a server that is communicatively coupled to an automated teller machine via a network, may receive a recorded user interaction and transaction data for the recorded user interaction. The recorded user interaction may be from a camera such as camera 605 illustrated in FIG. 6. The transaction data may be from an automated teller machine such as automated teller machine 607 illustrated in FIG. 6. At step 703 the server may determine an emotion state for a user of the automated teller machine based on the recorded user interaction. At step 705 the server may extract environmental data from the recorded user interaction. In some embodiments, the extraction of environmental data is optional, but may serve as an input to a baseline determination of a user's emotional state. In this way, certain external environmental factors (such as inclement weather) may be considered so as contributing factors of a user's emotional state. At step 707 the server may determine a quality indicator for the recorded user interaction based on at least one of the determined emotion state, the transaction data, and the environmental data. At step 709 the server may update a user profile based on the determined quality indicator for the user interaction. At step 711 the server may transmit the updated user profile to the automated teller machine.

The emotion state for a user may be determined for distinct aspects of the recorded user interaction. For example, a single transaction such as a withdrawal may be divided into distinct aspects such as login, selection of a withdrawal transaction, enter withdrawal amount, receipt of funds, closing the transaction, and the like. In some embodiments, the emotion state for the user may be determined for each of the distinct aspects for the transaction. In some embodiments, a global emotion state reflective of the user's overall experience across the entire transaction and/or a plurality of distinct aspects may be determined.

Similar to the process described at step 709 where the server may update a user profile based on the determined quality indicator for the user interaction illustrated in FIG. 7, in some embodiments, the global parameters described above may also be updated based on emotion state determined for distinct aspects of the recorded user interaction and/or for a global emotion state. Additionally, in some embodiments, the global parameters may be updated based on recorded user interactions across multiple individuals, or groups of individuals.

For example, if recorded user interactions across a plurality of individuals indicate that many individuals are surprised or frustrated during a particular aspect of a user transaction, one or more global parameters corresponding to the particular aspect may be updated.

In some embodiments, quality indicators may be determined for the overall transaction or for particular aspects of the transaction.

Figure 8:
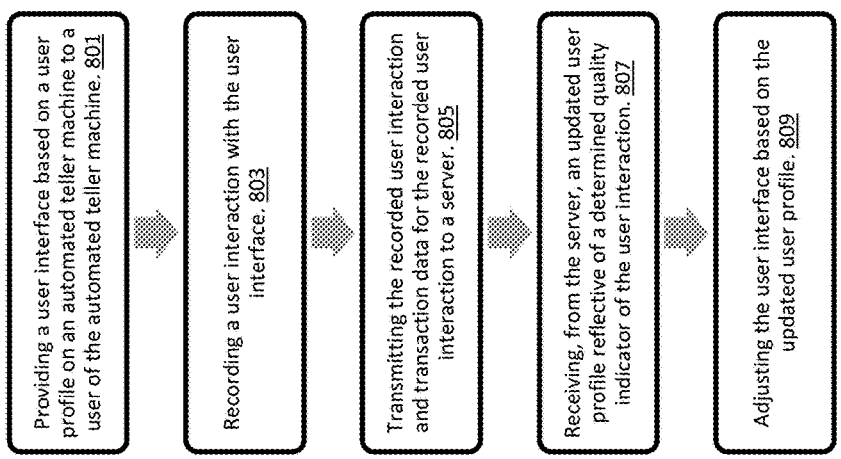
FIG. 8 is a flowchart of an exemplary process for evaluating ATM personalization systems in accordance with an aspect of the present disclosure.

FIG. 8 shows an exemplary process for evaluating ATM personalization systems, consistent with disclosed embodiments. At step 801, a user of the automated teller machine, such as that illustrated in FIG. 6, may be provided a user interface that is based on a user profile. At step 803, a user interaction with the provided user interface may be recorded by a camera such as camera 605 illustrated in FIG. 6. At step 805 the recorded user interaction and the transaction data for the recorded user interaction may be transmitted to a server such as server system 603 in FIG. 6. At step 807 the automated teller machine may receive, from the server, an updated user profile reflective of a determined quality indicator of the user interaction. At step 809 the user interface may be adjusted based on the updated user profile.

In some examples, some or all of the logic for the above-described techniques may be implemented as a computer program or application or as a plug-in module or sub component of another application. The described techniques may be varied and are not limited to the examples or descriptions provided. In some examples, applications may be developed for download to mobile communications and computing devices, e.g., laptops, mobile computers, tablet computers, smart phones, etc., being made available for download by the user either directly from the device or through a website.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, while a financial service provider has been described herein as the entity detecting and identifying customers, it is to be understood that consistent with disclosed embodiments another entity may provide such services in conjunction with or separate from a financial service provider.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

The invention claimed is:

1. A method for improving a user interface of an automated teller machine comprising:
   receiving, on a server communicatively coupled to the automated teller machine via a network, a recorded user interaction between a user and the user interface of the automated teller machine and transaction data for the recorded user interaction, wherein the server further comprises a non-transitory memory storing computer-readable instructions and at least one processor;
   applying, by a camera data processor of the server, image processing to the recorded user interaction to determine an emotion state for the user of the automated teller machine;
   determining, by a classification module of the server, a quality indicator for the recorded user interaction based on at least one of the determined emotion state and the transaction data, wherein the quality indicator is indicative of the user's satisfaction while interacting with the user interface of the automated teller machine and correlates user reaction with the user interface;

updating, by a user interface adjustment module of the server, a user profile based on the determined quality indicator for the user interaction; and adjusting, by the user interface adjustment module, at least one parameter of the user interface of the automated teller machine based on the updated user profile, wherein the at least one parameter is configured to alter the user interface of the automated teller machine to affect a user's satisfaction based on the at least one determined emotion state.

2. The method of claim 1, further comprising:

generating one or more quality indicator parameters by applying a machine learning algorithm to at least one of emotion states and transaction data for historical user interactions; and storing the generated one or more quality indicator parameters in a database communicatively coupled to the server.

3. The method of claim 2, wherein determining the quality indicator for the recorded user interaction further comprises:

applying the generated one or more quality indicator parameters to the recorded user interaction to determine the quality indicator for the recorded user interaction.

4. The method of claim 1, wherein the transaction data further comprises at least one of transaction type data, time of day data, timing data, keystroke data, button data, age group data, and language data.

5. The method of claim 1, further comprising: extracting environmental data from the record user interaction, the quality indicator being further based at least in part on the environmental data, wherein the environmental data includes at least one of weather data, temperature data, and time of day data.

6. The method of claim 1, wherein the determined emotion state is at least one of anger, happiness, sadness, disgust, surprise, and fear, and the quality indicator is at least one of a binary value, a categorical value and a numerical value.

7. The method of claim 1, wherein a user profile further comprises at least one of a height, a language, a gender, an age, an address, and an income.

8. The method of claim 1, further comprising: determining an emotion state for a user for each of a plurality of distinct aspects of the transaction and determining a quality indicator for each of the distinct aspects.

* * * * *